R. J. SHANK.
COMBINED ALTITUDE GAGE AND THERMOMETER.
APPLICATION FILED AUG. 7, 1911.
1,031,679. Patented July 2, 1912.
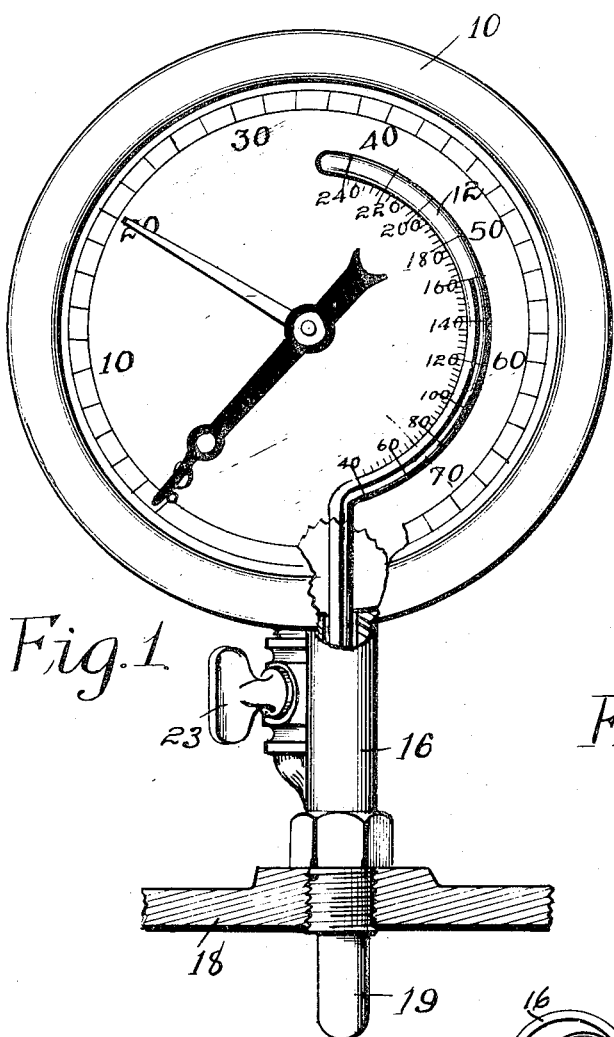
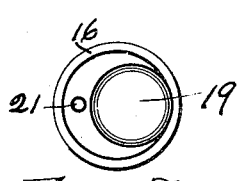
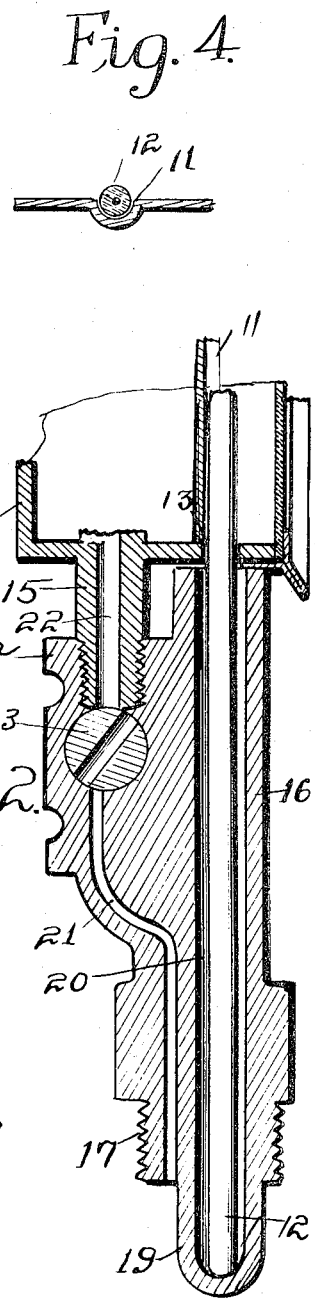
Witnesses
A. G. Hague
W. A. Loftus
Inventor
Reuben J. Shank
by J. Ralph Drwig atty

UNITED STATES PATENT OFFICE.

REUBEN J. SHANK, OF DES MOINES, IOWA.

COMBINED ALTITUDE-GAGE AND THERMOMETER.

1,031,679.　　　　Specification of Letters Patent.　　Patented July 2, 1912.

Application filed August 7, 1911. Serial No. 642,650.

*To all whom it may concern:*

Be it known that I, REUBEN J. SHANK, a citizen of the United States, residing at Des Moines, in the county of Polk and State of Iowa, have invented a certain new and useful Combined Altitude-Gage and Thermometer, of which the following is a specification.

Heretofore altitude gages and temperature thermometers have been attached to boilers in a hot water heating plant at separate points thereon requiring a double tapping of the boiler wall. A fitting or attachment whereby both may be secured to the boiler through a single tapping is desirable.

The object of my invention is to provide a device of simple, durable and inexpensive construction that may be readily, quickly and easily applied to a boiler of a hot water heating plant or the like, by unskilled persons, without danger of breaking or injuring the delicate mechanism thereof when thus fitting the same to a boiler.

A further object is to provide a device of this kind, which when properly fitted, will perform both the function of an altitude gage and a thermometer combined in the same device.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a front elevation of a small section of a boiler wall equipped with my improved attachment with an altitude gage and temperature thermometer secured thereto. Fig. 2 shows a vertical, sectional view through my attachment. Fig. 3 shows an inverted, plan view of the attachment, and Fig. 4 shows a sectional view of a part of the face of the altitude gage showing the groove therein and the temperature thermometer contained in said grooves.

In the accompanying drawings, I have used the reference numeral 10 to indicate an altitude gage of ordinary construction in complete form ready for use and including a casing of the ordinary form. I preferably provide on the face of my gage a groove 11 designed to receive the temperature thermometer 12. The temperature thermometer 12 may be curved, as shown in Fig. 1. The scale for temperature may be indicated on the face of the altitude gage. The temperature thermometer emerges from the case of the altitude gage through an opening 13. Extending downwardly from the lower side of the casing of the altitude gage, is an extension 15, screw threaded at its lower end.

My device also comprises a fitting 16, which may be cast complete in one piece, and which has a screw-threaded portion 17 near its lower end designed to be received in the screw-threaded opening of a boiler 18. The central portion of the fitting 16 extends downwardly below the screw-threaded portion 17 forming an extension 19. In the fitting 16 is a straight longitudinal chamber 20 extending from the upper end of the fitting to a point near the lower end of the extension 19. This chamber 20 is designed to receive the lower end of the thermometer 12 with the bulb of the latter resting in the extension 19, which when used is inside of the boiler. On the side of the upper end of the fitting 16 is a screw-threaded extension 20ª designed to receive the screw-threaded end of the extension 15 on the casing of the altitude gage. A passage way 21 extends through the part 20ª and communicates at its upper end with the hollow extension 15 and at its lower end with the interior of the boiler. A smaller opening 21 communicates with the lower end of said screw threaded opening and also with the lower end of the body 16. It will thus be seen that the opening 21 communicates with the interior of the boiler when the attachment is installed. The downward extension 15 of the altitude gage is provided with a central longitudinal opening 22 which communicates with the mechanism of the altitude gage and when the extension 15 is screwed into the screw threaded opening of the body 16 the opening 22 communicates with the opening 21. The body 16 is provided with a shut-off valve 23 for controlling the passage of water through the opening 21.

In assembling my attachment and fitting it to a boiler, I remove the glass front from the altitude gage and screw the extension 15 into the fitting 16. I then place the thermometer in the chamber 20 and replace the glass front on the altitude gage. The attachment is then ready for installation and may be fitted to a boiler wall 18, or if an operator thinks there may be danger of breaking the delicate mechanism of the altitude gage, or of breaking the thermometer during the operation of screwing the device into a boiler, he may readily and easily obviate such danger by removing the fitting from the altitude gage and then screwing the fitting alone into the boiler. After the fitting has been firmly and securely screwed into the boiler, the operator then takes the altitude gage and screws the extension 15 thereof into the extension 20ª of the fitting. This operation can easily be performed by hand as the casing of the altitude gage can be readily and easily grasped by an operator for this purpose. After this has been done the thermometer may be very readily and easily placed in position, it being understood that when the casing of the altitude gage is screwed into the fitting it shall be turned around to position where the opening in the casing of the altitude gage will register with the chamber 20 of the fitting.

It will be seen that when my improved attachment is used the altitude of the water may be readily determined since the altitude gage is in direct communication with the water through the opening 21. Whenever the user may desire to shut off communication between the altitude gage and the boiler, this may be done by means of the valve 23. The bulb of the temperature thermometer rests in the extension 19 of the body of my attachment and is thus held within the boiler where the temperature of the interior of the boiler will be accurately indicated.

Among the advantages of my invention is the great economy affected thereby, first, in the original cost of construction of the device and second, in the great saving in the time required by a plumber in fitting my device to a boiler. At the present time, it is customary to equip the boiler of a hot water heating plant with an altitude gage having an independent casing of its own and secured to the boiler at one point, and also with a thermometer having an independent case of its own and secured to the boiler at another point. In my improvement, the expense of the case of the thermometer is entirely avoided, for the case of the altitude gage is made to serve the double function of taking both the altitude gage and the thermometer, and substantially no additional expense is incurred in the manufacture of my improved device by including the case of the thermometer in the case of the altitude gage. However, a greater economy is effected in the time required by an operator in attaching my improved device to a boiler for with the use of a separate casing for each of these instruments, it is necessary for the operator to tap the boiler at two places and then he must screw both the case of the altitude gage and the case of the thermometer, into these two separate openings. With my improved device only one opening need be formed in the boiler and the entire device may be screwed into this one opening. Another advantage is that with my improved device, the operator may if he desires detach the fitting and the thermometer tube from the device and then screw the fitting into the boiler independently. While this is being done, there is absolutely no danger of injuring the delicate mechanism of the altitude gage nor of breaking the thermometer tube, then after the fitting has been firmly screwed into place, the casing of the altitude gage may be screwed into the fitting without the use of tools and without danger of injuring the mechanism and finally the thermometer tube may be placed in position without danger of breaking it.

I claim as my invention:

1. A device of the class described, comprising an altitude gage including a suitable casing having a hollow screw-threaded extension and also having an opening adjacent to the extension, a fitting, provided with a screw-threaded portion to be screwed into a boiler, said fitting having a chamber therein open at its top and closed at its bottom, a lateral extension on the fitting having a screw-threaded upper end to receive the extension on the said casing, and also having a passage-way therein extended from the top of the lateral extension to a point below the screw-threaded portion of the fitting, designed to permit the passage of liquid from a boiler to the altitude gage, and a thermometer tube inserted through the opening in the casing and extended into the chamber in the fitting.

2. A device of the class described, comprising an altitude gage including a suitable casing having a hollow screw-threaded extension and also having an opening adjacent to the extension, a fitting, provided with a screw-threaded portion to be screwed into a boiler, said fitting having a chamber therein open at its top and closed at its bottom, a lateral extension on the fitting having a screw-threaded upper end to receive the extension on the said casing, and also having a passage-way therein extended from the top of the lateral extension to a point below the screw-threaded portion of the fitting, designed to permit the passage of liquid from a boiler to the altitude gage, and a thermometer tube inserted through the opening in the casing and extended into the chamber in the fitting, the said altitude gage being provided with a dial having a groove therein to receive the thermometer tube and also having indicating marks adjacent to said groove and the said fitting being provided with a valve to control the passage-way therein, for the purposes stated.

Des Moines, Iowa, July 22, 1911.

REUBEN J. SHANK.

Witnesses:
M. WALLACE,
W. A. LOFTUS.